(12) United States Patent
Takahashi

(10) Patent No.: US 12,722,649 B2
(45) Date of Patent: Sep. 1, 2026

(54) VEHICLE WARNING APPARATUS

(71) Applicant: SUBARU CORPORATION, Tokyo (JP)

(72) Inventor: Tetsuya Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 12 days.

(21) Appl. No.: 18/986,862

(22) Filed: Dec. 19, 2024

(65) Prior Publication Data

US 2025/0242825 A1 Jul. 31, 2025

(30) Foreign Application Priority Data

Jan. 29, 2024 (JP) ................................ 2024-010860

(51) Int. Cl.

| | |
|---|---|
| ***B60W 50/14*** | (2020.01) |
| ***B60W 40/08*** | (2012.01) |
| ***G06V 20/59*** | (2022.01) |
| ***G06V 40/10*** | (2022.01) |

(52) U.S. Cl.

CPC ............ *B60W 50/14* (2013.01); *B60W 40/08* (2013.01); *G06V 20/597* (2022.01); *G06V 40/10* (2022.01); *B60W 2040/0818* (2013.01); *B60W 2420/403* (2013.01); *B60W 2520/10* (2013.01); *B60W 2540/229* (2020.02)

(58) Field of Classification Search

CPC ................ B60W 50/14; B60W 40/08; B60W 2040/0818; B60W 2420/403; B60W 2520/10; B60W 2540/229; B60W 40/09; B60W 2050/143; B60W 2050/146; G06V 20/597; G06V 40/10

See application file for complete search history.

(56) References Cited

U.S. PATENT DOCUMENTS

| | | | | |
|---|---|---|---|---|
| 2021/0012126 | A1* | 1/2021 | Porta | B60H 1/00742 |
| 2021/0394766 | A1* | 12/2021 | Crawford | A61B 5/18 |
| 2023/0078591 | A1* | 3/2023 | Link, II | G08B 21/18 340/539.13 |

FOREIGN PATENT DOCUMENTS

| | | | | |
|---|---|---|---|---|
| CN | 107380164 A | * 11/2017 | | G06V 10/764 |
| JP | 2017-111508 A | 6/2017 | | |
| JP | 2018-156539 A | 10/2018 | | |

* cited by examiner

*Primary Examiner* — Rufus C Point

(74) *Attorney, Agent, or Firm* — Rimon P.C.

(57) ABSTRACT

A vehicle warning apparatus to be applied to a vehicle is configured to give a warning to a driver who drives the vehicle in accordance with a state of the driver and a state of use of a mobile device by the driver in traveling of the vehicle. The vehicle warning apparatus includes: a near-infrared image data obtainer configured to acquire near-infrared image data; a visible light image data obtainer configured to acquire visible light image data; and a warner configured to determine the state of the use of the mobile device by the driver, based on the near-infrared image data and the visible light image data, and give the warning to the driver in accordance with a result of determining the state of the use of the mobile device by the driver.

14 Claims, 5 Drawing Sheets

VEHICLE WARNING APPARATUS

CROSS-REFERENCE TO RELATED APPLICATIONS

The present application claims priority from Japanese Patent Application No. 2024-010860 filed on Jan. 29, 2024, the entire contents of which are hereby incorporated by reference.

BACKGROUND

The disclosure relates to a vehicle warning apparatus.

With spread of mobile devices such as a smartphone or a tablet terminal, distracted driving has occasionally been reported in which a driver who drives a vehicle stares at or operates such a mobile device in traveling of the vehicle. Such distracted driving by the driver may possibly induce an unexpected event of the vehicle. To address this concern, some techniques have been proposed to restrict a behavior of the driver such as a driver's operation on the mobile device.

For example, Japanese Unexamined Patent Application Publication (JP-A) No. 2017-111508 discloses a data processing apparatus that urges a driver who drives a vehicle to make safe driving, upon determining that the driver is operating a device such as a smartphone, based on position data on a predetermined part of the driver and a difference in light reflectance in the vicinity of the predetermined part.

Further, JP-A No. 2018-156539 discloses a warning apparatus that gives a warning to a driver who drives a vehicle, upon determining that the driver is using a mobile device in traveling of the vehicle, based on heat distribution in a compartment of the vehicle measured by an infrared sensor and a shift position detected by a shift sensor.

SUMMARY

An aspect of the disclosure provides a vehicle warning apparatus to be applied to a vehicle. The vehicle warning apparatus is configured to give a warning to a driver who drives the vehicle in accordance with a state of the driver and a state of use of a mobile device by the driver in traveling of the vehicle. The vehicle warning apparatus includes a near-infrared image data obtainer, a visible light image data obtainer, and a warner. The near-infrared image data obtainer is configured to acquire near-infrared image data that is based on an image captured by a near-infrared camera disposed in a compartment of the vehicle. The visible light image data obtainer is configured to acquire visible light image data that is based on an image captured by a visible light camera disposed in the compartment of the vehicle. The warner is configured to determine the state of the use of the mobile device by the driver, based on the near-infrared image data and the visible light image data. The warner is configured to give the warning to the driver in accordance with a result of determining the state of the use of the mobile device by the driver. The warner is configured to stop the warning or lower a level of the warning when a functionality being used in the mobile device is a permitted functionality whose use is permitted in advance.

An aspect of the disclosure provides a vehicle warning apparatus to be applied to a vehicle. The vehicle warning apparatus is configured to give a warning to a driver who drives the vehicle in accordance with a state of the driver and a state of use of a mobile device by the driver in traveling of the vehicle. The vehicle warning apparatus includes circuitry. The circuitry is configured to acquire near-infrared image data that is based on an image captured by a near-infrared camera disposed in a compartment of the vehicle. The circuitry is configured to acquire visible light image data that is based on an image captured by a visible light camera disposed in the compartment of the vehicle. The circuitry is configured to determine the state of the use of the mobile device by the driver, based on the near-infrared image data and the visible light image data. The circuitry is configured to give the warning to the driver in accordance with a result of determining the state of the use of the mobile device by the driver. The circuitry is configured to stop the warning or lower a level of the warning when a functionality being used in the mobile device is a permitted functionality whose use is permitted in advance.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
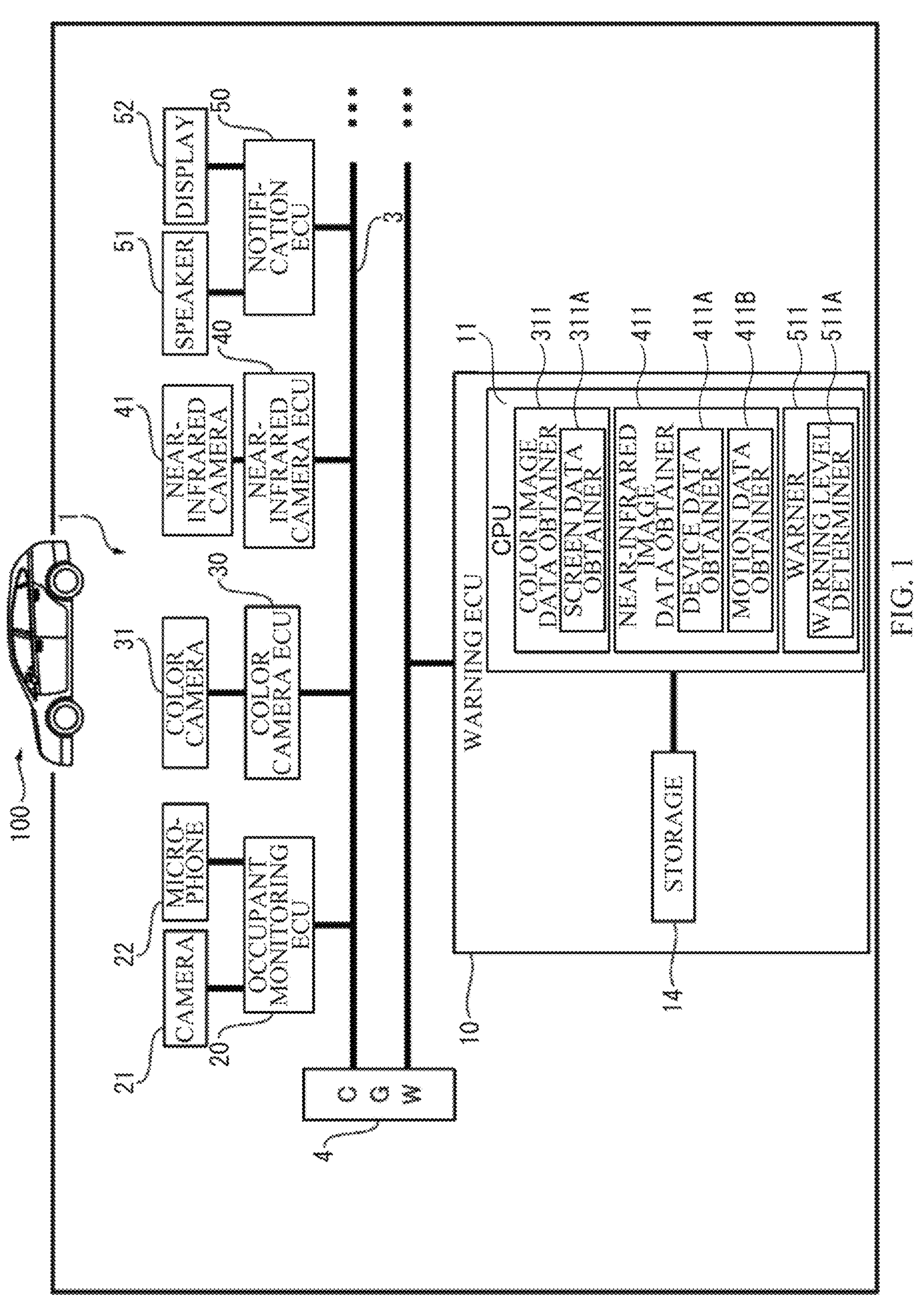
FIG. 1 is an explanatory diagram illustrating a schematic configuration of a vehicle control system including a vehicle warning apparatus according to one example embodiment of the disclosure.

An increasing number of drivers who drive vehicles have used mobile devices to acquire information necessary for driving of the vehicles. For example, a driver uses the mobile device to check for a travel route to a destination and a travel time to reach the destination using a navigation functionality of the mobile device. While unreasonable driver's operations on the mobile device in traveling of the vehicles are to be strictly restricted, reasonable driver's operations on the mobile device for use of a predetermined functionality such as the navigation functionality are to be permitted as long as safety is ensured.

A data processing apparatus disclosed in JP-A No. 2017-111508 or a warning apparatus disclosed in JP-A No. 2018-156539, however, uniformly gives a warning to a driver who drives a vehicle, upon determining that the driver is operating a mobile device. Such a configuration basically prohibits the driver from operating and using the mobile device. This may possibly decrease user-friendliness because the driver is not permitted to operate and use the mobile device even for use of a predetermined functionality providing information necessary for driving of the vehicle.

It is desirable to achieve both safety and user-friendliness by relaxing restrictions on driver's operations for use of a predetermined functionality of a mobile device, while calling driver's attention to the restrictions on driver's operations on the mobile device in traveling of a vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Referring to FIG. 1, a vehicle warning apparatus or a warning electronic control unit (ECU) 10 according to an example embodiment of the disclosure may be provided in a vehicle 100 as a part of a vehicle control system 1. The vehicle control system 1 may include various electronic devices and multiple in-vehicle electronic control units (ECUs). The various electronic devices may be used for traveling of the vehicle 100. The multiple in-vehicle ECUs may control these electronic devices. The electronic devices, the in-vehicle ECUs, and any other device or unit may be communicably coupled to each other via an in-vehicle network 3 and may be each coupled to a central gateway (CGW) 4 serving as a relay device, to thereby operate as the vehicle control system 1. Non-limiting examples of the in-vehicle network 3 may include a controller area network (CAN) and a local interconnect network (LIN).

In some embodiments, each of the in-vehicle ECUs may include: a processor or an electrical circuit such as a central processing unit (CPU) or a micro processing unit (MPU); and a storage including a memory device such as a random-access memory (RAM) or a read-only memory (ROM). In some embodiments, all or a part of the operation of some of the in-vehicle ECUs may be executed by hardware such as an application-specific integrated circuit (ASIC), a field-programmable gate array (FPGA), or a graphics processing unit (GPU).

In the following description, an electronic device, an in-vehicle ECU, and any other device or unit indirectly involved in an operation of the vehicle warning apparatus according to the present example embodiment will be neither illustrated nor described in detail. In one embodiment, the warning ECU 10 may serve as the "vehicle warning apparatus".

As illustrated in FIG. 1, the vehicle control system 1 may include the warning ECU 10, an occupant monitoring ECU 20, a color camera ECU 30, a near-infrared camera ECU 40, and a notification ECU 50 as the in-vehicle ECUs. Each of the in-vehicle ECUs may be coupled to the corresponding electronic device or electronic devices to be controlled by the in-vehicle ECU, and control an operation of the corresponding coupled electronic device or electronic devices, based on data acquired from the in-vehicle network 3. Further, each of the in-vehicle ECUs may output, to the in-vehicle network 3, data on the operation of the corresponding coupled electronic device or electronic devices acquired from the electronic device or electronic devices.

In the present example embodiment, the warning ECU 10, the occupant monitoring ECU 20, the color camera ECU 30, the near-infrared camera ECU 40, and the notification ECU 50 may perform transmission and reception of data with each other and control the operations of the respective electronic devices. In some embodiments, the warning ECU 10 may monitor a state of a driver who drives the vehicle 100 and a state of use of a mobile device 80 by the driver, based on data received from the occupant monitoring ECU 20, the color camera ECU 30, and the near-infrared camera ECU 40, and give a warning to the driver by sending the notification ECU 50 a control signal related to the warning, based on a monitoring result. The warning ECU 10 will be described in detail later.

The occupant monitoring ECU 20 may operate as a part of a driver monitoring system (DMS) that monitors an occupant such as the driver of the vehicle 100. The occupant monitoring ECU 20 may monitor the occupant by controlling electronic devices included in the DMS and coupled to the occupant monitoring ECU 20, such as a camera 21, a microphone 22, an unillustrated illuminator that illuminates the occupant, an unillustrated seat occupancy sensor provided in a seat of the vehicle 100, or an unillustrated sensor that detects opening and closing of a door of the vehicle 100. Non-limiting examples of the illuminator may include a light-emitting diode (LED) and any device having an illuminating functionality.

The color camera ECU 30 may be coupled to a color camera 31. The color camera ECU 30 may control the color camera 31 to thereby monitor the state of the use of the mobile device 80 disposed at or around a driver's seat of the vehicle 100. The color camera 31 may be provided at a position above the driver's seat, such as on a ceiling or a pillar of the vehicle 100, from which an image of the driver's seat and the driver is capturable. In some embodiments, the color camera 31 may capture an image of the driver who is seated on the driver's seat and surroundings of the driver in a predetermined cycle and output the captured image as color image data to the color camera ECU 30. In one embodiment, the color camera 31 may serve as a "visible light camera".

The color camera ECU 30 may output the color image data to the in-vehicle network 3. In some embodiments, the color camera ECU 30 may output various kinds of data included in the color image data to the in-vehicle network 3. The color camera ECU 30 may be configured to extract, as the data included in the color image data, screen data indicating data such as a state of a screen of the mobile device 80 and content displayed on the screen, and output the extracted screen data to the in-vehicle network 3.

In the present example embodiment, the visible light camera may be the color camera 31; however, this is a non-limiting example and any other visible light camera than the color camera 31 may be employed as long as the visible light camera is able to extract image data, such as color image data or visible light image data, including the screen data of the mobile device 80. In some embodiments where the visible light image data is acquired from any other visible light camera than the color camera 31, the visible light image data may be a color image or a monochromatic image.

When the image captured by the color camera 31 includes a two-dimensional code that is displayed on the screen of the mobile device 80 and by which a functionality or an application in use is identifiable, the color camera ECU 30 may include the two-dimensional code in the screen data as functionality identification data and output the resultant screen data to the in-vehicle network 3. Non-limiting examples of the two-dimensional code may include an icon and a QR code (registered trademark).

In some embodiments, the screen data may include, as lighting data, data indicating that the screen of the mobile device 80 is lit or unlit or data indicating a degree of brightness of the screen being lit of the mobile device 80. The data indicating that the screen of the mobile device 80 is lit or unlit may be based on a lighting state of a backlight of the mobile device 80. Non-limiting examples of the data indicating the degree of the brightness of the screen being lit of the mobile device 80 may include data indicating that the screen is brightly lit and data indicating that the screen is dimly lit. The degree of the brightness may depend on a kind of the mobile device 80 or a setting state of the mobile device 80. The backlight of the mobile device 80 may typically be in a brightly lit state when an operation is continuously performed on the mobile device 80, whereas being brought into a dimly lit state and then into an unlit state when an operation is not performed for a predetermined time period.

For example, the brightly lit state of the screen of the mobile device 80 may possibly induce distracted driving in which the driver frequently directs his/her line of sight to the screen of the mobile device 80. In night driving, the screen of the mobile device 80 may possibly generate uncomfortable glare due to a large luminance difference with surroundings of the screen of the mobile device 80. In view of these situations, the lighting data including such data indicating the degree of the brightness may be useful for a determination of the state of the use of the mobile device 80.

The near-infrared camera ECU 40 may be coupled to a near-infrared camera 41. The near-infrared camera ECU 40 may control the near-infrared camera 41 to thereby monitor a motion of a predetermined part 81 such as a hand or a finger of the driver and also the mobile device 80 disposed at or around the driver's seat. Similarly to the color camera 31, the near-infrared camera 41 may be provided at a position above the driver's seat, such as on the ceiling or the pillar, from which an image of the driver's seat and the driver is capturable. In some embodiments, the near-infrared camera 41 may capture an image of the driver who is seated on the driver's seat and the surroundings of the driver in a predetermined cycle and output the captured image as near-infrared image data to the near-infrared camera ECU 40.

In some embodiments, the near-infrared camera ECU 40 may output the near-infrared image data to the in-vehicle network 3. In some embodiments, the near-infrared camera ECU 40 may output various kinds of data included in the near-infrared image data to the in-vehicle network 3. The near-infrared camera ECU 40 may be configured to extract, as the data included in the near-infrared image data, data such as motion data indicating a position and a motion of the predetermined part 81 of the driver or device data indicating appearance characteristics of the mobile device 80, and output the extracted motion data or device data to the in-vehicle network 3. Non-limiting examples of the appearance characteristics may include a shape of the mobile device 80, a size of the mobile device 80, and a position of the screen of the mobile device 80.

When extracting the motion data, the near-infrared camera ECU 40 may be configured to calculate position coordinates of the predetermined part 81 such as the hand or the finger of the driver, based on the near-infrared image data, and include the position coordinates and displacement of these position coordinates in the motion data on the predetermined part 81. When extracting the device data, the near-infrared camera ECU 40 may be configured to calculate position coordinates of the mobile device 80 and displacement of these position coordinates and position coordinates of the screen of the mobile device 80 and displacement of these position coordinates, based on the near-infrared image data, and include the position coordinates of the mobile device 80 and the displacement of these position coordinates and the position coordinates of the screen of the mobile device 80 and the displacement of these position coordinates in the device data.

The color camera 31 and the near-infrared camera 41 may be each provided at any other position than that on the ceiling or the pillar as long as the color camera 31 and the near-infrared camera 41 are each able to capture an image of the driver's seat and the driver from above the driver's seat. In some embodiments, the color camera 31 and the near-infrared camera 41 may be each provided at such a position that a larger area inside the vehicle 100 is recognizable. Acquiring such an image for the recognition of a larger area inside the vehicle 100 helps to detect the state of the driver and the state of the use of the mobile device 80 in traveling of the vehicle 100, determine a state of the occupant who is seated on a back seat of the vehicle 100 in traveling of the vehicle 100, and prevent an article or a person such as a baby or an infant from being left in the vehicle 100 having been stopped, for example. In some embodiments, the color camera 31 and the near-infrared camera 41 may be disposed adjacent to each other. In some embodiments, the color camera 31 and the near-infrared camera 41 may be disposed separated from each other.

Figure 2:
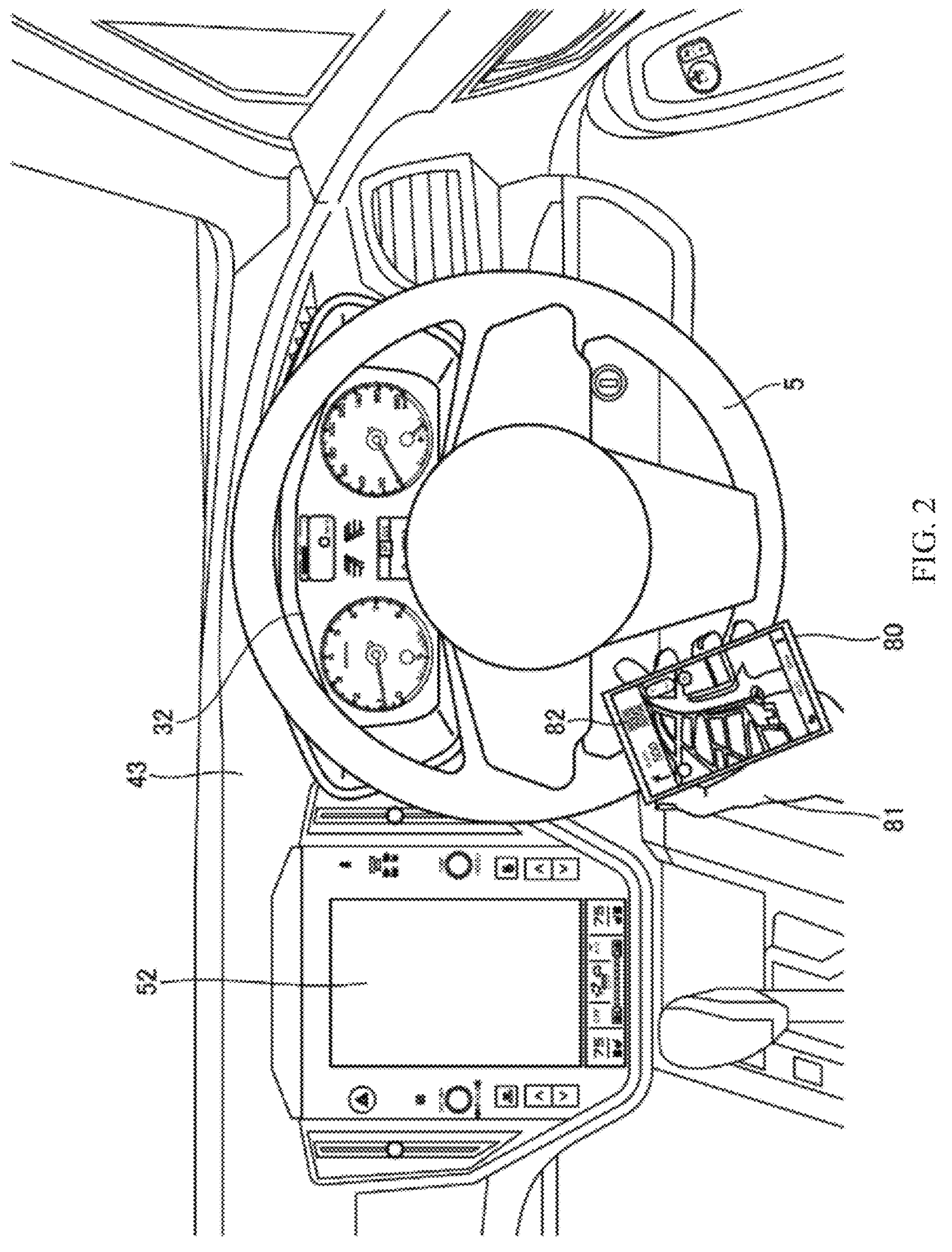
FIG. 2 is an explanatory diagram illustrating an exemplary captured image of an inside of a compartment of a vehicle mounted with the vehicle warning apparatus illustrated in FIG. 1.
Figure 3:
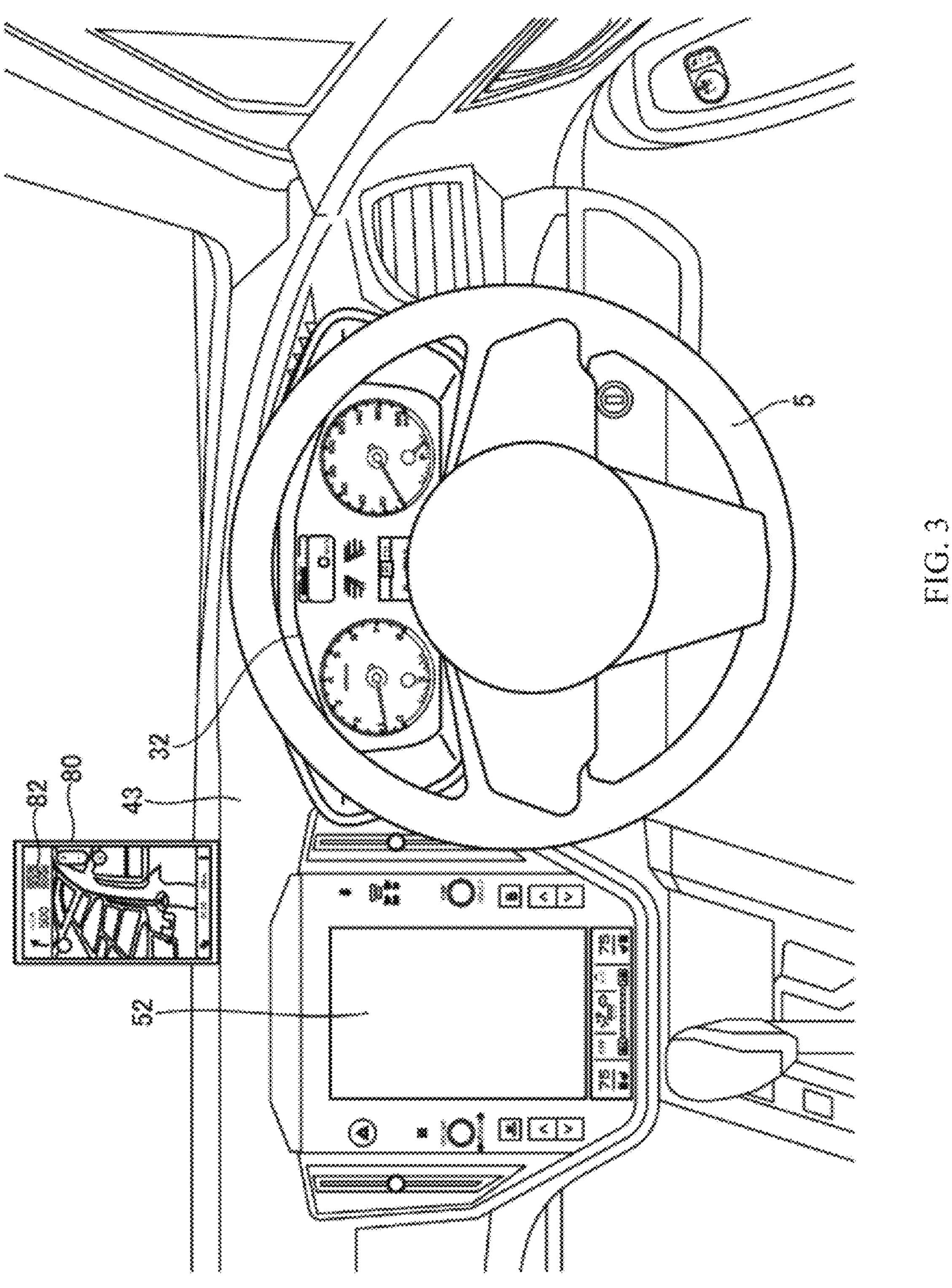
FIG. 3 is an explanatory diagram illustrating another exemplary captured image of the inside of the compartment of the vehicle mounted with the vehicle warning apparatus illustrated in FIG. 1.

FIGS. 2 and 3 each illustrate an exemplary image captured by the color camera 31.

Because the color camera 31 captures an image of the driver's seat and the driver from the position above the driver's seat such as on the ceiling or the pillar, the captured image may have a field of view including, for example, a steering wheel 5, a meter 32 in front of the driver's seat, an in-vehicle device such as a display 52, a dashboard 43, the predetermined part 81 such as the hand or the finger of the driver, and the screen of the mobile device 80 held by the driver.

Illustrated in FIG. 2 is an exemplary image of the mobile device 80 held in the predetermined part (the hand) 81 of the driver. Illustrated in FIG. 3 is an exemplary image of the mobile device 80 fixed to a predetermined position on the dashboard 43. In each of FIGS. 2 and 3, a QR code (registered trademark) 82 to be described later is displayed on the screen of the mobile device 80. Acquiring these images as moving images or acquiring these images as still images continuously or periodically helps to determine the state of the screen of the mobile device 80 and the content displayed on the screen that change over time.

The near-infrared camera 41 may radiate light including near-infrared rays to subjects, i.e., the driver and the surroundings of the driver, and capture an image that reflects a characteristic difference arising from light reflection or light absorption due to a material difference between these subjects. Such a configuration allows the near-infrared camera 41 to capture an image that clearly reflects, for example, the shape of the mobile device 80, the size of the mobile device 80 itself, the position of the screen of the mobile device 80, the size of the screen of the mobile device 80, the predetermined part 81 such as the hand or the finger of the driver, and the position of the predetermined part 81, regardless of whether the inside of the vehicle 100 is bright or dark. In other words, this configuration helps to acquire an image in which objects such as the screen of the mobile device 80 or the hand or the finger of the driver are discernable in a material level, even when the screen of the mobile device 80 is partially covered by the hand or the finger of the driver touching the screen of the mobile device 80, for example.

Accordingly, acquiring moving images or acquiring still images continuously or periodically by the near-infrared camera 41 helps to acquire the motion data on the motion of the hand or the finger of the driver and accurate device data on the position coordinates indicating the position of the screen of the mobile device 80 and the displacement of these position coordinates.

In some embodiments where the near-infrared camera 41 is disposed adjacent to the color camera 31, the image captured by the near-infrared camera 41 may have a layout substantially the same as that of the image captured by the color camera 31. Accordingly, in such embodiments where the near-infrared camera 41 is disposed adjacent to the color camera 31, the image captured by the near-infrared camera 41 may have a layout similar to those of the respective images captured by the color camera 31 illustrated in FIGS. 2 and 3, and clearly reflect, for example, the shape of the mobile device 80, the size of the mobile device 80, the position of the screen of the mobile device 80, the size of the screen of the mobile device 80, the hand or the finger of the driver, and the position of the driver.

Figure 4:
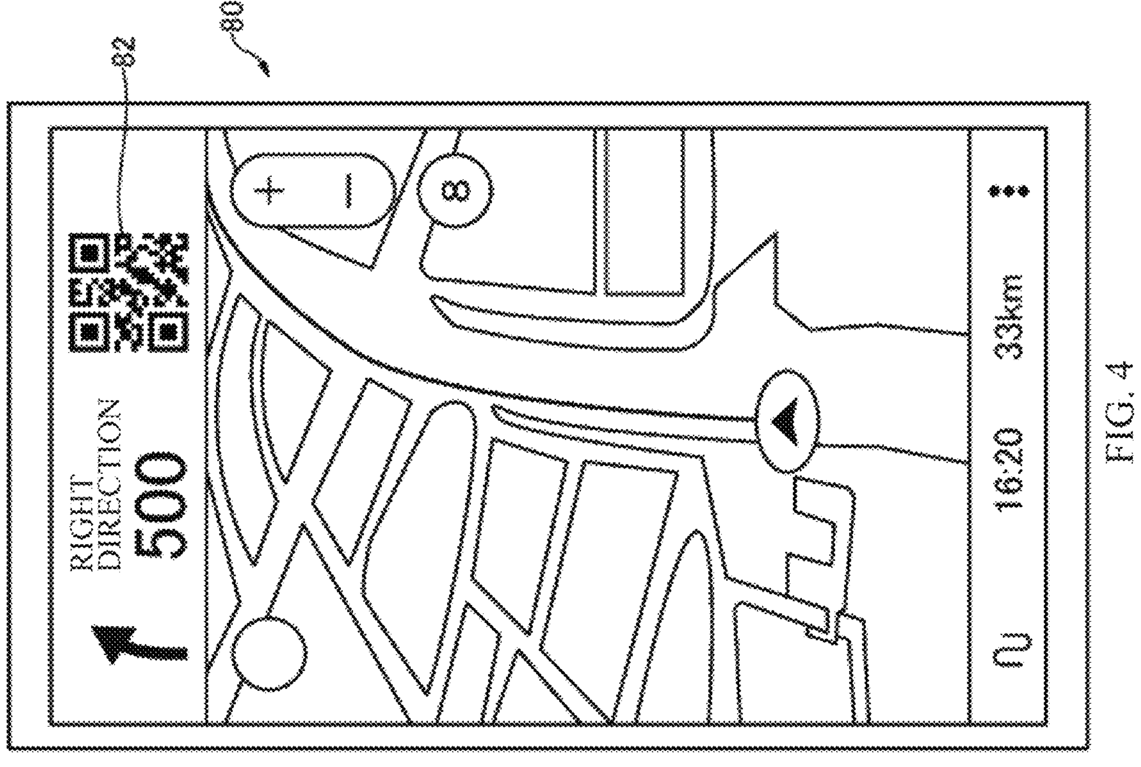
FIG. 4 is an explanatory diagram illustrating an exemplary screen of a mobile device to be used in the compartment of the vehicle mounted with the vehicle warning apparatus illustrated in FIG. 1.

FIG. 4 illustrates an exemplary screen of the mobile device 80. In the example of FIG. 4, the mobile device 80 may have a screen of a navigation functionality in use. The screen in the example of FIG. 4 may have an end at which the QR code (registered trademark) 82 is displayed serving as the functionality identification data indicating that the navigation functionality is in use. When such a QR code (registered trademark) 82 is included in the captured image, the color camera 31 may be configured to include the QR code (registered trademark) 82 as the functionality identification data in the screen data. The screen of the mobile device 80 may be configured to display, as the functionality identification data, not only the QR code (registered trademark) 82 but also a matrix two-dimensional code, a stacked two-dimensional code, an icon, a watermark, or any data that enables functionality identification.

The notification ECU 50 may be coupled to devices such as a speaker 51 or the display 52. In accordance with the control signal received from the warning ECU 10, the notification ECU 50 may control the speaker 51 or the display 52 to give a warning corresponding to a warning level to the driver of the vehicle 100.

In accordance with a notification instruction received from the notification ECU 50, the speaker 51 may be configured to output a later-described audio warning message set corresponding to the warning level or output a sound such as a predetermined warning sound. The speaker 51 may not be provided as a speaker dedicated to notification or warning. In some embodiments, the speaker 51 may also serve as a speaker of an in-vehicle audio device or a speaker of a navigation system.

The display 52 may include a device that displays an image visually recognizable by the occupant. Non-limiting examples of such a device may include a display panel of the dashboard 43 and a head-up display (HUD) that projects information onto a windshield of the vehicle 100. In some embodiments where the display 52 is the HUD, the display 52 may be configured to display a message or an image corresponding to a warning level onto the windshield of the vehicle 100 to thereby give a warning to the occupant such as the driver of the vehicle 100.

In some embodiments, alternatively or in addition thereto, the notification ECU 50 may control a vibrator such as a seat vibrator or a steering wheel vibrator to thereby give a warning with vibration to the driver in accordance with a warning level. The seat vibrator may vibrate the driver's seat on which the driver is seated. The steering wheel vibrator may vibrate the steering wheel 5.

The warning ECU 10 serving as the vehicle warning apparatus will now be described. As illustrated in FIG. 1, the warning ECU 10 may include a central processing unit (CPU) 11 and a storage 14. In some embodiments, the storage 14 may include: a volatile memory such as a RAM that temporarily processes data to be used by the CPU 11; and a rewritable nonvolatile memory such as a ROM that holds software such as a program to be executed by the CPU 11.

The CPU 11 may execute various kinds of processing in accordance with a program held in the storage 14. In the present example embodiment, the CPU 11 operates as a color image data obtainer 311, a near-infrared image data obtainer 411, and a warner 511 that are illustrated in FIG. 1 by executing the program held in the storage 14. In one embodiment, the color image data obtainer 311 may serve as a "visible light image data obtainer".

The storage 14 may further hold data necessary to cause the CPU 11 to operate as the color image data obtainer 311, the near-infrared image data obtainer 411, and the warner 511. In the following, the color image data obtainer 311, the near-infrared image data obtainer 411, and the warner 511 will be described.

The color image data obtainer 311 acquires color image data based on the image captured by the color camera 31 disposed in the compartment of the vehicle 100. In some embodiments, the color image data obtainer 311 may include a screen data obtainer 311A that acquires the screen data included in the color image data via the in-vehicle network 3.

The screen data obtainer 311A may acquire the screen data indicating the state of the screen of the mobile device 80 and the content displayed on the screen, extracted from the color image data. The screen data may include at least the lighting data indicating a lighting state of the screen of the mobile device 80, as well as the functionality identification data by which a functionality or an application in use is identifiable when an icon or a two-dimensional code such as the QR code (registered trademark) 82 is displayed on the screen of the mobile device 80.

When using the mobile device 80 in traveling of the vehicle 100, the driver may stare at or operate the screen of the mobile device 80 and thus pay less attention to surroundings in front of the vehicle 100. This may possibly induce an unexpected event of the vehicle 100. Such a situation where the driver is using the mobile device 80 in traveling of the vehicle 100 may be necessary to handle by giving a warning to the driver or calling driver's attention. Accordingly, the screen data obtainer 311A may acquire the screen data including the lighting data indicating the lighting state of the screen of the mobile device 80, as a part of data usable for the determination of the state of the use of the mobile device 80 by the driver.

In some cases, however, the driver may use the mobile device 80 to acquire information necessary for driving of the vehicle 100. For example, the driver may check for a travel route to a destination or a travel time to reach the destination using the navigation functionality of the mobile device 80.

The driver may be permitted to use a predetermined functionality such as the navigation functionality to some extent without being given a warning similar to one given for use of any other functionality as long as safety is ensured. Accordingly, including the functionality identification data in the screen data allows a later-described warning level determiner 511A to determine whether the functionality being used in the mobile device 80 is a permitted functionality whose use is permitted in advance.

The screen data obtainer 311A may be configured to acquire the screen data extracted from the color image data from the color camera ECU 30 via the in-vehicle network 3. In some embodiments, alternatively or in addition thereto, the screen data obtainer 311A may acquire the color image data serving as the image captured by the color camera 31, and acquire the screen data, based on the color image data by calculation.

The near-infrared image data obtainer 411 acquires the near-infrared image data based on the image captured by the near-infrared camera 41 disposed in the compartment of the vehicle 100. In some embodiments, the near-infrared image data obtainer 411 may include a device data obtainer 411A and a motion data obtainer 411B, and acquire the device data and the motion data included in the near-infrared image data via the in-vehicle network 3 respectively with the device data obtainer 411A and the motion data obtainer 411B.

The device data obtainer 411A may acquire the device data indicating the appearance characteristics such as the shape of the mobile device 80, the size of the mobile device 80, or the position of the screen of the mobile device 80. The device data may include at least data on the position coordinates of the mobile device 80 and the displacement of these position coordinates and the position coordinates of the screen of the mobile device 80 and the displacement of these position coordinates.

The motion data obtainer 411B may acquire the motion data indicating the position and the motion of the predetermined part 81 of the driver. The motion data may include at least the position coordinates of the predetermined part 81 such as the hand or the finger of the driver and the displacement of these position coordinates.

The warning level determiner 511A to be described later may be configured to acquire the device data and the motion data in addition to the screen data to thereby determine whether the driver is making a motion suspected of being an operation on the mobile device 80 and determine the state of the use of the mobile device 80. Non-limiting examples of the motion suspected of being the operation on the mobile device 80 may include a motion of the finger or the hand of the driver touching the screen of the mobile device 80.

The device data obtainer 411A and the motion data obtainer 411B may be configured to respectively acquire directly the device data and the motion data extracted from the near-infrared image data, from the near-infrared camera ECU 40 via the in-vehicle network 3. In some embodiments, alternatively or in addition thereto, the device data obtainer 411A and the motion data obtainer 411B may each acquire the image captured by the near-infrared camera 41, and may respectively acquire the screen data and the motion data, based on the captured image by calculation.

The warner 511 determines the state of the use of the mobile device 80 by the driver, based on the near-infrared image data and the visible light image data, and gives a warning to the driver in accordance with a determination result. In some embodiments, the warner 511 may determine the state of the driver and the state of the use of the mobile device 80 by the driver, based on the screen data included in the color image data as well as the device data and the motion data included in the near-infrared image data, and give a warning to the driver in accordance with the state of the driver and the state of the use of the mobile device 80 by the driver.

In some embodiments, the warner 511 may determine the state of the use of the mobile device 80 by using a learned model having learned the screen data, the device data, and the motion data. In such embodiments, the storage 14 may hold in advance the learned model having learned the screen data, the device data, and the motion data, and the CPU 11 operating as the warner 511 may be configured to read the learned model held in the storage 14 and input current screen data, current device data, and current motion data into the learned model to thereby cause the learned model to output the state of the use of the mobile device 80.

In some embodiments, alternatively or in addition thereto, the storage 14 may hold a learned model having learned the color image data and the near-infrared image data. In such embodiments, the warner 511 may be configured to input current color image data and current near-infrared image data into the learned model to thereby cause the learned model to extract the screen data included in the color image data as well as the device data and the motion data included in the near-infrared image data, and may be configured to determine the state of the use of the mobile device 80, based on the extracted screen data, device data, and motion data.

When the functionality being used in the mobile device 80 is the permitted functionality whose use is permitted in advance, the warner 511 stops the warning or lowers a level of the warning.

To perform these operations, the warner 511 may include the warning level determiner 511A that determines a warning level corresponding to the state of the driver and the state of the use of the mobile device 80 by the driver, based on the device data, the motion data, and the screen data. In some embodiments, the warning level determiner 511A may set multiple warning levels corresponding to respective states of the driver and respective states of the use of the mobile device 80 by the driver.

In some embodiments, the warning level determiner 511A may acquire monitoring data resulting from monitoring a state of the occupant, such as a seated state of the occupant or a line of sight of the occupant, from the occupant monitoring ECU 20 via the in-vehicle network 3, and use the monitoring data for the determination of the warning level.

In some embodiments, the warning level determiner 511A may be configured to acquire line-of-sight data on the line of sight of the driver from among various pieces of the monitoring data to thereby determine whether the driver is directing his/her line of sight forward (i.e., whether the driver is engaging in distracted driving) or whether the driver is staring at the screen of the mobile device 80. This helps to make a more appropriate determination of the warning level. In some embodiments, the warning level determiner 511A may be configured to calculate a direction of the line of sight of the driver and position coordinates of a target present in the driver's line of sight, based on an image captured by the camera 21, and include one or more of the calculated direction of line of sight, the calculated position coordinates, the calculated displacement of the position coordinates, and any data on the driver's line of sight in the line-of-sight data acquired from the occupant monitoring ECU 20.

In some embodiments, the warning level determiner 511A may be configured to acquire control data indicating whether the vehicle 100 is traveling under the control of an advanced driver assistance mode and speed data indicating a travel speed (i.e., a vehicle speed) of the vehicle 100, and use the acquired control data and speed data for the determination of the warning level. When acquiring the speed data, the warning level determiner 511A is allowed to make a more accurate determination of the warning level by reflecting the speed data in a final determination result by a method such as increasing the warning level as the vehicle speed is higher. Note that the term "advanced driver assistance mode" used herein may refer to a mode that assists in driving by executing partial automation of the driving under certain conditions, for example.

The warner 511 may give a warning corresponding to the warning level determined by the warning level determiner 511A to the driver. In some embodiments, the warner 511 may output the control signal related to the warning corresponding to the above-described warning level to the notification ECU 50 via the in-vehicle network 3, and give the warning to the driver via the notification ECU 50.

In some embodiments, the warner 511 may be configured to give a warning to the driver by outputting an audio warning message, displaying a warning message, rumbling a warning sound, vibrating the driver's seat, and vibrating the steering wheel 5, either alone or in combination. The warner 511 may give the warning corresponding to the warning level by changing a sound volume of the warning sound, a sound volume of the audio warning message, strength of the vibration of the driver's seat, or strength of the vibration of the steering wheel 5 in accordance with the warning level.

The storage 14 may hold data received from the screen data obtainer 311A, the device data obtainer 411A, and the motion data obtainer 411B. In some embodiments, the storage 14 may further hold data such as a table in which the state of the driver and the state of the use of the mobile device 80 by the driver are each set corresponding to the warning level, or a table in which the warning level is set corresponding to the warning message.

Figure 5:
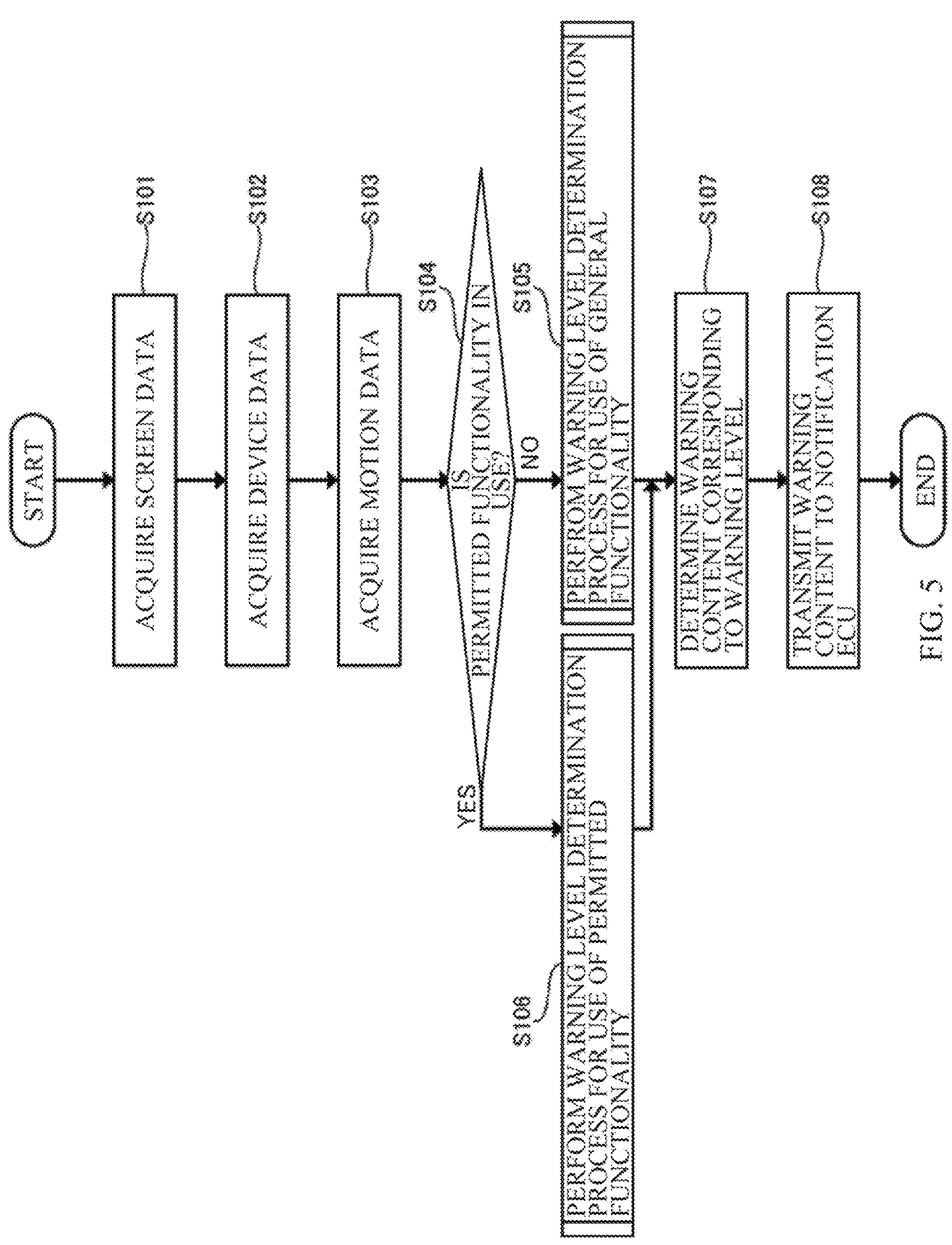
FIG. 5 is a flowchart illustrating a flow of warning processing performed by the vehicle warning apparatus illustrated in FIG. 1.

In the following, warning processing performed by the warning ECU 10 having the above-described configuration will be described with reference to a flowchart illustrated in FIG. 5. Note that the mobile device 80 whose navigation functionality is being used as the permitted functionality will be described below.

The screen data obtainer 311A of the warning ECU 10 may acquire the screen data indicating the state of the screen of the mobile device 80 and the content displayed on the screen (step S101). The device data obtainer 411A may acquire the device data indicating the shape and the position of the mobile device 80 (step S102). The motion data obtainer 411B may acquire the motion data indicating the position and the motion of the predetermined part 81 such as the hand or the finger of the driver (step S103). The screen data obtainer 311A, the device data obtainer 411A, and the motion data obtainer 411B may respectively output the screen data, the device data, and the motion data to the warning level determiner 511A.

When the functionality identification data is included in the screen data, the warning level determiner 511A may determine whether the functionality being used in the mobile device 80 is the navigation functionality, based on the functionality identification data (step S104). If determining that the functionality being used in the mobile device 80 is not the navigation functionality and thus is an unpermitted or general functionality, based on the functionality identification data (step S104: NO), the warning level determiner 511A may determine that a functionality other than the permitted functionality is in use and perform a warning level determination process for use of the general functionality (step S105).

If determining that the functionality being used in the mobile device 80 is the navigation functionality (step S104: YES), the warning level determiner 511A may perform a warning level determination process for use of the permitted functionality (step S106). When the warning level determiner 511A determines the warning level in the warning level determination process (step S105 or step S106), the warner 511 may determine warning content corresponding to the determined warning level (step S107). Thereafter, the warner 511 may output a control signal indicating the warning content determined in step S107 to the notification ECU 50 (step S108) and give a warning to the driver.

The warning level determiner 511A may detect the state of the driver and the state of the use of the mobile device 80, based on the acquired screen data, device data, and motion data, and determine the warning level. In some embodiments, the data usable for the determination of the warning level may include data as to whether the screen of the mobile device 80 is being lit, whether the hand or the finger of the driver is making a motion suspected of being an operation on the mobile device 80, and whether the mobile device 80 is disposed at a predetermined position. When the permitted functionality is determined to be in use, the warning level determiner 511A may set the warning level to one lower than the warning level for the use of the general functionality. Such a configuration permits the use of the permitted functionality to the extent that safety is ensured, resulting in an improvement in user-friendliness.

In some embodiments, the warning level determination process in step S106 for the use of the permitted functionality and the warning level determination process in step S105 for the use of the general functionality may be separate from and independent of each other. In some embodiments, the warning level determination process for the use of the permitted functionality may be performed in step S106 in a similar way to the warning level determination process in step S105 for the use of the general functionality, and if the permitted functionality is determined to be in use, the warning level may be set to one lower than the warning level for the use of the general functionality.

According to the present example embodiment described above, when the functionality being used in the mobile device 80 is the permitted functionality whose use is permitted in advance, the warning level determiner 511A of the vehicle warning apparatus selects a warning level lower than the warning level for the use of the general functionality if a predetermined condition is satisfied. In other words, the vehicle warning apparatus may call the driver's attention to the restrictions on the use of the general functionality of the mobile device 80 when the general functionality other than the permitted functionality is used in traveling of the vehicle 100, whereas relaxing the restrictions on the use of a predetermined permitted functionality by permitting the use of the predetermined permitted functionality when the predetermined condition is satisfied. Such a configuration helps to achieve both the safety and the user-friendliness.

In some embodiments, the warning level determiner 511A may acquire the above-described screen data, device data, and motion data, based on the color image data acquired by the color camera 31 and the near-infrared image data acquired by the near-infrared camera 41. The near-infrared image data may reflect the characteristic difference arising from the light reflection or light absorption due to the material difference between the subjects. Such a configuration enables accurate detection of, for example, the shape of the mobile device 80, the size of the mobile device 80 itself, the position of the screen of the mobile device 80, the size of the screen of the mobile device 80, the predetermined part 81 such as the hand or the finger of the driver, and the position of the predetermined part 81, regardless of whether the inside of the vehicle 100 is bright or dark.

This configuration enables discerning objects such as the screen of the mobile device 80 or the hand or the finger of the driver in a material level, even when the screen of the mobile device 80 is partially covered by the hand or the finger of the driver touching the screen of the mobile device 80, for example. Further, the use of the color image data leads to accurate recognition of, for example, the data displayed on the screen of the mobile device 80, facilitating the acquisition of the functionality identification data displayed on the screen of the mobile device 80.

In other words, the vehicle warning apparatus according to the present example embodiment makes it possible to detect the state of the driver and the state of the use of the mobile device 80 more accurately, based on the color image data acquired by the color camera 31 and the near-infrared image data acquired by the near-infrared camera 41, and give an optimal warning to the driver.

As illustrated in FIG. 1, the vehicle 100 mounted with the vehicle control system 1 including the vehicle warning apparatus (the warning ECU 10) described above may relax the restrictions on the use of a predetermined permitted functionality such as the navigation functionality, while giving an appropriate warning to the driver or appropriately calling the driver's attention when the driver uses the mobile device 80 in traveling of the vehicle 100. Such a configuration helps to achieve both the safety and the user-friendliness.

As described above, the vehicle warning apparatus according to the present example embodiment may relax the restrictions on driver's operations for the use of a predetermined functionality, while calling the driver's attention to the restrictions on driver's operations on the mobile device 80 in traveling of the vehicle 100. Such a configuration helps to achieve both the safety and the user-friendliness.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a", "an", and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "substantially", "approximately", "about", and its variants having the similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

The CPU 11 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the CPU 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the CPU 11 illustrated in FIG. 1.

The invention claimed is:

1. A vehicle warning apparatus for a vehicle, the vehicle warning apparatus being configured to give a warning to a driver who drives the vehicle in accordance with a state of the driver and a state of use of a mobile device by the driver while the vehicle is traveling, the vehicle warning apparatus comprising:

a near-infrared image data obtainer configured to acquire near-infrared image data that is based on an image captured by a near-infrared camera disposed in a compartment of the vehicle;

a visible light image data obtainer configured to acquire visible light image data that is based on an image captured by a visible light camera disposed in the compartment of the vehicle; and a warner configured to determine the state of the use of the mobile device by the driver, based on the near-infrared image data and the visible light image data, the warner being configured to give the warning to the driver in accordance with a result of determining the state of the use of the mobile device by the driver, wherein the warner is configured to stop the warning or lower a level of the warning when a functionality being used in the mobile device is a permitted functionality whose use is permitted in advance, wherein the near-infrared image data comprises motion data and device data, the motion data indicating a position of a predetermined part of the driver and a motion of the predetermined part of the driver, the device data comprising a position of the mobile device and an appearance characteristic of the mobile device, wherein the visible light image data comprises screen data indicating content displayed on a screen of the mobile device, and wherein the screen data comprises lighting data and functionality identification data, the lighting data indicating a lighting state of the screen of the mobile device, the functionality identification data being configured to be displayed on the screen of the mobile device when the permitted functionality is in use.

2. The vehicle warning apparatus according to claim 1, wherein the warner is configured to determine whether the functionality being used in the mobile device is the permitted functionality, based on the screen data.

3. The vehicle warning apparatus according to claim 2, wherein the permitted functionality comprises a navigation functionality.

4. The vehicle warning apparatus according to claim 1, wherein the functionality identification data comprises an icon or a two-dimensional code.

5. The vehicle warning apparatus according to claim 1, wherein the warner is configured to lower the level of the warning when the vehicle is traveling in an advanced driver assistance mode.

6. The vehicle warning apparatus according to claim 1, wherein the warner is configured to acquire speed data indicating a travel speed of the vehicle, and raise the level of the warning as the travel speed of the vehicle increases.

7. The vehicle warning apparatus according to claim 1, wherein the near-infrared camera and the visible light camera are disposed on a ceiling or a pillar in the compartment of the vehicle.

8. A vehicle warning apparatus for a vehicle, the vehicle warning apparatus being configured to give a warning to a driver who drives the vehicle in accordance with a state of the driver and a state of use of a mobile device by the driver while the vehicle is traveling, the vehicle warning apparatus comprising circuitry configured to acquire near-infrared image data that is based on an image captured by a near-infrared camera disposed in a compartment of the vehicle, acquire visible light image data that is based on an image captured by a visible light camera disposed in the compartment of the vehicle, determine the state of the use of the mobile device by the driver, based on the near-infrared image data and the visible light image data, and give the warning to the driver in accordance with a result of determining the state of the use of the mobile device by the driver, and stop the warning or lower a level of the warning when a functionality being used in the mobile device is a permitted functionality whose use is permitted in advance, wherein the near-infrared image data comprises motion data and device data, the motion data indicating a position of a predetermined part of the driver and a motion of the predetermined part of the driver, the device data comprising a position of the mobile device and an appearance characteristic of the mobile device, wherein the visible light image data comprises screen data indicating content displayed on a screen of the mobile device, and wherein the screen data comprises lighting data and functionality identification data, the lighting data indicating a lighting state of the screen of the mobile device, the functionality identification data being configured to be displayed on the screen of the mobile device when the permitted functionality is in use.

9. The vehicle warning apparatus according to claim 8, wherein the circuitry is further configured to determine whether the functionality being used in the mobile device is the permitted functionality, based on the screen data.

10. The vehicle warning apparatus according to claim 9, wherein the permitted functionality comprises a navigation functionality.

11. The vehicle warning apparatus according to claim 8, wherein the functionality identification data comprises an icon or a two-dimensional code.

12. The vehicle warning apparatus according to claim 8, wherein the circuitry is further configured to lower the level of the warning when the vehicle is traveling in an advanced driver assistance mode.

13. The vehicle warning apparatus according to claim 8, wherein the circuitry is further configured to acquire speed data indicating a travel speed of the vehicle, and raise the level of the warning as the travel speed of the vehicle increases.

14. The vehicle warning apparatus according to claim 8, wherein the near-infrared camera and the visible light camera are disposed on a ceiling or a pillar in the compartment of the vehicle.

* * * * *